United States Patent
Takeda et al.

(10) Patent No.: US 12,342,333 B2
(45) Date of Patent: Jun. 24, 2025

(54) MULTICAST DOWNLINK CONTROL INFORMATION CONFIGURATION

(71) Applicant: QUALCOMM Incorporated, San Diego, CA (US)

(72) Inventors: Kazuki Takeda, Tokyo (JP); Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 17/443,923

(22) Filed: Jul. 28, 2021

(65) Prior Publication Data

US 2022/0039103 A1 Feb. 3, 2022

Related U.S. Application Data

(60) Provisional application No. 63/058,935, filed on Jul. 30, 2020.

(51) Int. Cl.
*H04W 72/121* (2023.01)
*H04W 24/08* (2009.01)
*H04W 72/1263* (2023.01)
*H04W 72/23* (2023.01)

(52) U.S. Cl.
CPC ......... *H04W 72/121* (2013.01); *H04W 24/08* (2013.01); *H04W 72/1263* (2013.01); *H04W 72/23* (2023.01)

(58) Field of Classification Search
CPC .. H04L 5/0053; H04W 24/08; H04W 72/121; H04W 72/1263; H04W 72/23; H04W 72/30
See application file for complete search history.

(56) References Cited

U.S. PATENT DOCUMENTS

| | | | | |
|---|---|---|---|---|
| 10,506,574 B2 * | 12/2019 | Zhang | ................... | H04L 12/189 |
| 10,595,326 B2 * | 3/2020 | Liao | ...................... | H04L 5/0053 |
| 11,191,071 B2 * | 11/2021 | Yi | ........................ | H04W 72/23 |
| 11,239,939 B2 * | 2/2022 | Papasakellariou | .... | H04L 5/0053 |
| 11,477,705 B2 * | 10/2022 | Basu Mallick | ....... | H04W 76/19 |

(Continued)

FOREIGN PATENT DOCUMENTS

| | | | | |
|---|---|---|---|---|
| CA | 2895959 C * | 4/2018 | ........... | H04L 1/0003 |
| CA | 3138219 A1 * | 11/2020 | ........... | H04L 5/0053 |

(Continued)

OTHER PUBLICATIONS

3GPP TS 38.212, Multiplexing and channel coding, Jun. 2020, 3GPP, Release 16, Version 16.2.0 (Year: 2020).*

(Continued)

*Primary Examiner* — Eric Nowlin
(74) *Attorney, Agent, or Firm* — Harrity & Harrity, LLP

(57) ABSTRACT

Various aspects of the present disclosure generally relate to wireless communication. In some aspects, a user equipment (UE) may determine that a quantity of downlink control information (DCI) sizes, for a set of DCIs that the UE is to monitor and that includes a multicast DCI, satisfies a size threshold. The UE may perform a DCI size alignment procedure to adjust a DCI monitoring configuration. The UE may monitor for the set of DCIs based at least in part on performing the DCI size alignment procedure. Numerous other aspects are provided.

30 Claims, 12 Drawing Sheets

(56) References Cited

U.S. PATENT DOCUMENTS

| | | | | |
|---|---|---|---|---|
| 11,671,974 B2* | 6/2023 | Lee | H04W 72/0446 | |
| | | | 370/336 | |
| 12,010,051 B2* | 6/2024 | Horiuchi | H04L 1/0008 | |
| 12,063,671 B2* | 8/2024 | Lin | H04W 72/53 | |
| 2014/0286223 A1* | 9/2014 | Yu | H04W 36/32 | |
| | | | 370/312 | |
| 2017/0347341 A1* | 11/2017 | Zhang | H04B 7/024 | |
| 2018/0167959 A1* | 6/2018 | Liao | H04W 72/121 | |
| 2019/0297604 A1* | 9/2019 | Lee | H04L 5/0053 | |
| 2019/0387501 A1 | 12/2019 | Park et al. | | |
| 2020/0100248 A1 | 3/2020 | Kim et al. | | |
| 2020/0146044 A1* | 5/2020 | Maaref | H04W 72/02 | |
| 2020/0304230 A1* | 9/2020 | Papasakellariou | H04L 1/0006 | |
| 2020/0328840 A1* | 10/2020 | Salah | H04W 24/08 | |
| 2020/0337029 A1* | 10/2020 | Yi | H04L 5/0053 | |
| 2020/0351780 A1* | 11/2020 | Liao | H04W 76/27 | |
| 2021/0058833 A1* | 2/2021 | Basu Mallick | H04W 36/0055 | |
| 2021/0274320 A1 | 9/2021 | Chen et al. | | |
| 2021/0368509 A1* | 11/2021 | Lin | H04W 72/23 | |
| 2022/0039103 A1* | 2/2022 | Takeda | H04W 72/23 | |
| 2022/0039116 A1* | 2/2022 | Takeda | H04W 72/23 | |
| 2022/0039141 A1* | 2/2022 | Takeda | H04L 5/001 | |
| 2022/0116143 A1* | 4/2022 | Luo | H04W 72/0079 | |
| 2022/0124788 A1* | 4/2022 | Kittichokechai | H04W 72/1263 | |
| 2022/0158788 A1* | 5/2022 | Horiuchi | H04L 1/0008 | |
| 2022/0167320 A1* | 5/2022 | Lee | H04W 72/23 | |
| 2022/0210775 A1* | 6/2022 | Li | H04L 1/1854 | |
| 2022/0240187 A1* | 7/2022 | Guo | H04L 5/0053 | |
| 2022/0353710 A1* | 11/2022 | Yoshioka | H04W 72/1273 | |

FOREIGN PATENT DOCUMENTS

| | | | | |
|---|---|---|---|---|
| CN | 107852713 A * | 3/2018 | | H04B 7/024 |
| CN | 108432307 A * | 8/2018 | | H04L 5/00 |
| CN | 110034842 A | 7/2019 | | |
| CN | 111903088 A * | 11/2020 | | H04L 1/0008 |
| CN | 112088566 A * | 12/2020 | | H04L 1/0008 |
| CN | 112312351 A * | 2/2021 | | H04L 1/1607 |
| CN | 112956152 A * | 6/2021 | | H04L 5/0053 |
| CN | 113661677 A * | 11/2021 | | H04L 1/0008 |
| CN | 113692769 A * | 11/2021 | | H04L 1/1812 |
| CN | 113767681 A * | 12/2021 | | H04L 5/0053 |
| CN | 107852713 B * | 3/2022 | | H04B 7/024 |
| CN | 108432307 B * | 6/2022 | | H04L 5/00 |
| CN | 113748732 B * | 12/2022 | | H04L 1/1854 |
| CN | 116134745 A * | 5/2023 | | H04W 72/1289 |
| CN | 111903088 B * | 9/2023 | | H04L 1/0008 |
| EP | 3861657 A1 * | 8/2021 | | H04L 1/1607 |
| EP | 3861657 A4 * | 12/2021 | | H04L 1/1607 |
| EP | 3920635 A1 * | 12/2021 | | H04L 1/1812 |
| EP | 3920635 B1 * | 5/2023 | | H04L 1/1812 |
| EP | 3944694 B1 * | 10/2023 | | H04L 1/1854 |
| EP | 4018772 B1 * | 11/2023 | | H04B 7/06954 |
| EP | 4322667 A2 * | 2/2024 | | H04L 1/003 |
| EP | 3861657 B1 * | 7/2024 | | H04L 1/1607 |
| EP | 4401347 A2 * | 7/2024 | | H04L 1/1607 |
| JP | 2018504052 A * | 2/2018 | | |
| JP | 2021518690 A * | 8/2021 | | |
| JP | 2022521689 A * | 4/2022 | | |
| JP | 2022528231 A * | 6/2022 | | |
| JP | 7238147 B2 * | 3/2023 | | H04L 1/0008 |
| JP | 7365399 B2 * | 10/2023 | | H04L 1/0008 |
| KR | 20220002542 A * | 1/2022 | | |
| TW | 202046795 A * | 12/2020 | | H04L 1/0008 |
| TW | I766264 B * | 6/2022 | | |
| WO | WO-2019183443 A1 * | 9/2019 | | H04L 1/0008 |
| WO | 2019215706 A1 | 11/2019 | | |
| WO | 2020085991 A1 | 4/2020 | | |
| WO | WO-2020147775 A1 * | 7/2020 | | H04L 1/0023 |
| WO | WO-2020165406 A1 * | 8/2020 | | H04L 1/0008 |
| WO | WO-2020204486 A1 * | 10/2020 | | H04L 1/1671 |
| WO | WO-2020211768 A1 * | 10/2020 | | H04L 1/0008 |
| WO | WO-2020220310 A1 * | 11/2020 | | H04L 5/0053 |
| WO | WO-2021033023 A1 * | 2/2021 | | H04B 7/06954 |
| WO | WO-2022027062 A1 * | 2/2022 | | H04W 24/08 |
| WO | WO-2022027064 A1 * | 2/2022 | | H04W 24/08 |
| WO | WO-2022027065 A1 * | 2/2022 | | H04W 72/1289 |
| WO | WO-2022205367 A1 * | 10/2022 | | |
| WO | WO-2022205570 A1 * | 10/2022 | | |
| WO | WO-2023153997 A1 * | 8/2023 | | |

OTHER PUBLICATIONS

International Search Report and Written Opinion—PCT/US2021/071056—ISA/EPO—Nov. 30, 2021.

Wilus Inc: "Remaining Issues on PDCCH Enhancement for NR URLLC", 3GPP TSG RAN WG1 #100, 3GPP Draft, R1-2000935, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, 13 Pages, Feb. 15, 2020 (Feb. 15, 2020), XP051853514, Retrieved from the Internet: URL: https://ftp.3gpp.org/tsg_ran/WG1_RL1/TSGR1_100_e/Docs/R1-2000935.zip [retrieved on Feb. 15, 2020] Section "3 Remaining Issues on DCI size alignment".

Huawei: "TS38.212 V0.1.0 NR; Multiplexing and Channel Coding", 3GPP TSG RAN WG1 Meeting #90, R1-1714659, Prague, Czech Republic, Aug. 21, 2017-Aug. 25, 2017, 23 Pages, Aug. 29, 2017.

* cited by examiner

| 300 | Step 305 | Step 310 | Step 315 | Step 320 |
|---|---|---|---|---|
| CSS DCI 0_0 | Size A | | | |
| CSS DCI 1_0 | Size A | | | |
| USS DCI 0_0 | | Size B | | |
| USS DCI 1_0 | | Size B | | |
| USS DCI 0_1 | | | Size C (+1 bit if aligned with size B) | |
| USS DCI 1_1 | | | Size D (+1 bit if aligned with size B) | |
| USS DCI 0_2 | | | | Size E |
| USS DCI 1_2 | | | | Size F |

FIG. 3A

| | Step 325 | Step 330 | Step 335 | Step 340 |
|---|---|---|---|---|
| CSS DCI 0_0 | Check if no more than 4 sizes and no more than 3 sizes with C-RNTI? | Size A | Size A | Size A |
| CSS DCI 1_0 | | Size A | Size A | Size A |
| USS DCI 0_0 | | Size B => Size A | Size A | Size A |
| USS DCI 1_0 | | Size B => Size A | Size A | Size A |
| USS DCI 0_1 | | Size C (remove the +1 bit) | Size C | Size C => Size C/D |
| USS DCI 1_1 | | Size D (remove the +1 bit) | Size D | Size D => Size C/D |
| USS DCI 0_2 | | Size E | Size E => Size E/F | Size E |
| USS DCI 1_2 | | Size F | Size F => Size E/F | Size F |

FIG. 3B

|  | UE 1 | UE 2 | UE 3 |
|---|---|---|---|
| C-RNTI DCI size 1 | 40 | 40 | 40 |
| C-RNTI DCI size 2 | 60 | 55 | 100 |
| C-RNTI DCI size 3 | 80 | 85 | - |
| GC-PDCCH 1 | 32 => 75 | - | - |
| GC-PDCCH 2 | - | 48 => 75 | 48 => 75 |
| Multicast DCI |  | 75 |  |

MULTICAST DOWNLINK CONTROL INFORMATION CONFIGURATION

CROSS-REFERENCE TO RELATED APPLICATION

This patent application claims priority to U.S. Provisional Patent Application No. 63/058,935, filed on Jul. 30, 2020, entitled "MULTICAST DOWNLINK CONTROL INFORMATION CONFIGURATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for multicast downlink control information configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining that a quantity of downlink control information (DCI) sizes, for a set of DCIs that the UE is to monitor and that includes a multicast DCI, satisfies a size threshold; performing a DCI size alignment procedure to adjust a DCI monitoring configuration; and monitoring for the set of DCIs based at least in part on performing the DCI size alignment procedure.

In some aspects, a UE for wireless communication includes: a memory and one or more processors coupled to the memory, the one or more processors configured to: determine that a quantity of DCI sizes, for a set of DCIs that the UE is to monitor and that includes a multicast DCI, satisfies a size threshold; perform a DCI size alignment procedure to adjust a DCI monitoring configuration; and monitor for the set of DCIs based at least in part on performing the DCI size alignment procedure.

In some aspects, a non-transitory computer-readable medium storing a set of instructions for wireless communication includes: one or more instructions that, when executed by one or more processors of a UE, cause the UE to: determine that a quantity of DCI sizes, for a set of DCIs that the UE is to monitor and that includes a multicast DCI, satisfies a size threshold; perform a DCI size alignment procedure to adjust a DCI monitoring configuration; and monitor for the set of DCIs based at least in part on performing the DCI size alignment procedure.

In some aspects, an apparatus for wireless communication includes: means for determining that a quantity of DCI sizes, for a set of DCIs that the apparatus is to monitor and that includes a multicast DCI, satisfies a size threshold; means for performing a DCI size alignment procedure to adjust a DCI monitoring configuration; and means for monitoring for the set of DCIs based at least in part on performing the DCI size alignment procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A and 3B are diagrams illustrating an example of downlink control information (DCI) size alignment, in accordance with the present disclosure.

FIG. 4 is a diagram illustrating an example of DCI size alignment, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
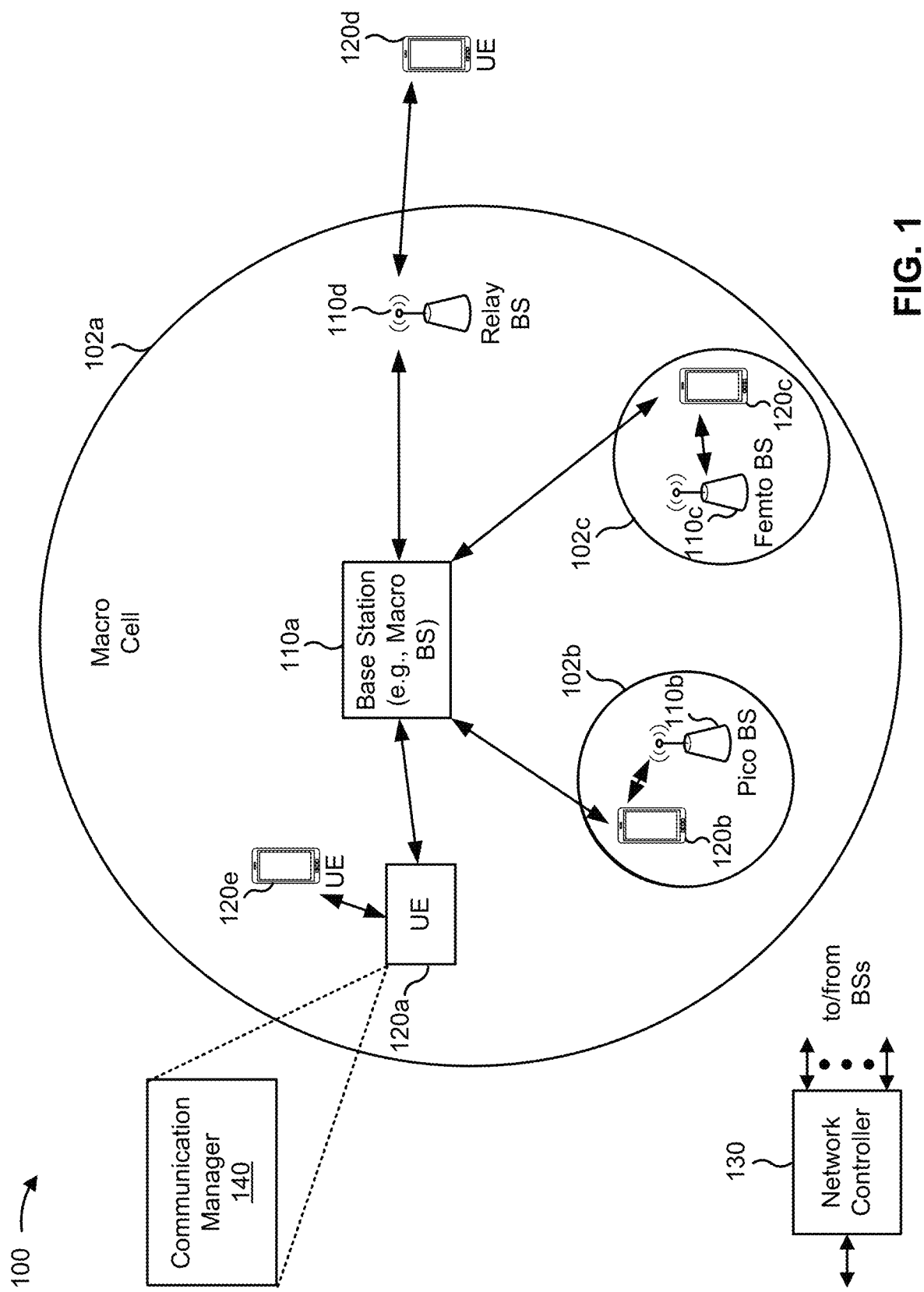
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine that a quantity of downlink control information (DCI) sizes, for a set of DCIs that the UE is to monitor and that includes a multicast DCI, satisfies a size threshold; perform a DCI size alignment procedure to adjust a DCI monitoring configuration; and monitor for the set of DCIs based at least in part on performing the DCI size alignment procedure. Additionally, or alternatively, the communication manager 140 may perform one or more other operations described herein.

As indicated above, FIG. 1 is provided as an example. Other examples may differ from what is described with regard to FIG. 1.

Figure 2:
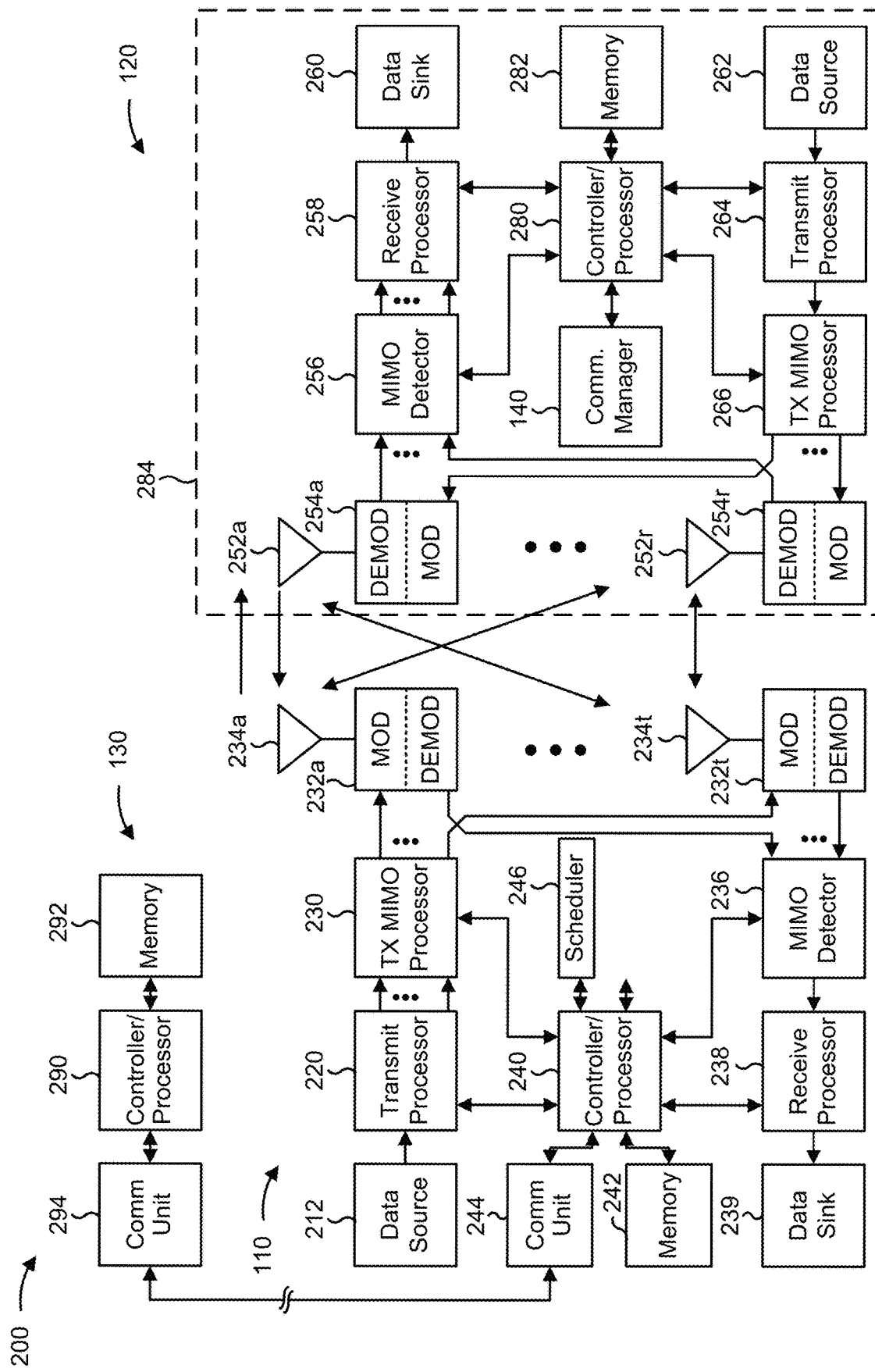
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-7).

The controller/processor 240 of the base station 110, the controller/processor 280 of the UE 120, and/or any other component(s) of FIG. 2 may perform one or more techniques associated with DCI size alignment, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, a UE, such as the UE 120, includes means for determining that a quantity of DCI sizes, for a set of DCIs that the UE is to monitor and that includes a multicast DCI, satisfies a size threshold; means for performing a DCI size alignment procedure to adjust a DCI monitoring configuration; and/or means for monitoring for the set of DCIs based at least in part on performing the DCI size alignment procedure. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A and 3B are diagrams illustrating an example 300 of DCI size alignment, in accordance with the present disclosure.

As shown in FIG. 3A, and by step 305, a UE may determine a first size, Size A, for a common search space (CSS) DCI 0_0 and for a CSS DCI 1_0 (if CSS DCI 0_0 or CSS DCI 1_0 are configured, respectively). In some cases, the UE may align the CSS DCI 0_0 to a size of the CSS DCI 1_0. For example, when the CSS DCI 0_0 has a larger size than the CSS DCI 1_0, the UE may add a set of zero padding bits to the CSS DCI 0_0 until the payload size is equal to that of the DCI 10. In contrast, if the CSS DCI 00 has a smaller size than the CSS DCI 10 prior to truncation, the UE may reduce the bitwidth of the frequency domain resource assignment (FDRA) field in the DCI 0_0 by truncating the first few most significant bits such that the size of DCI 0_0 equals to the size of the DCI 1_0.

As further shown in FIG. 3A, and by step 310, the UE may determine a second size, Size B, for a UE-specific search space (USS) DCI 0_0 and a USS DCI 1_0 (if USS DCI 0_0 or USS DCI 1_0 are configured, respectively). In some cases, the UE may align the USS DCI 0_0 and the USS DCI 1_0 to a common size by adding padding bits to a smaller one of the USS DCI 0_0 and the USS DCI 1_0.

As further shown in FIG. 3A, and by step 315, the UE may determine a third size, Size C, for a USS DCI 0_1 and a fourth size, Size D, for a USS DCI 1_1 (if USS DCI 0_1 or USS DCI 1_1 are configured, respectively). In some cases, the UE may determine Size C and/or Size D based at least in part on Size B. For example, the UE may set Size C and/or Size D as one bit greater than Size B.

As further shown in FIG. 3A, and by step 320, the UE may determine a fifth size, Size E, for a USS DCI 0_2 and a sixth size, Size F, for a USS DCI 1_2 (if USS DCI 0_2 or USS DCI 1_2 are configured, respectively).

As shown in FIG. 3B, and by step 325, the UE may determine whether a size threshold is satisfied. For example, based at least in part on which DCIs are configured for the UE, the UE may determine a quantity of DCI sizes. In other words, if CSS DCI 0_0 (Size A), CSS DCI 1_0 (Size A), USS DCI 0_1 (Size C), and USS DCI 0_2 (Size E) are configured, then there are three DCI sizes. In contrast, if CSS DCI 0_0 (Size A), USS DCI 0_0 (Size B), USS DCI 0_1 (Size C), and USS DCI 0_2 (Size E) are configured, then there are four DCI sizes. Based at least in part on determining the quantity of DCI sizes, the UE may determine whether there are more than 4 DCI sizes or more than 3 DCI sizes with a cell-specific radio network temporary identifier (C-RNTI) configured. If neither DCI size threshold is satisfied, then the UE may proceed without performing further steps of DCI size alignment. However, if either DCI size threshold is satisfied, then the UE may perform further steps of DCI size alignment, as described herein with regard to FIG. 3B and steps 330-340.

As further shown in FIG. 3B, and by step 330, the UE may perform a first set of size alignment actions. For example, the UE may maintain CSS DCI 0_0 and CSS DCI 1_0 (if configured) at Size A; the UE may align USS DCI 0_0 and/or USS DCI 1_0 (if configured) to Size A (e.g., using padding bits or truncating existing bits); the UE may remove the added bit in USS DCI 0_1 and USS DCI 1_1 (if configured) that was added with regard to step 315, and the UE may maintain a size of USS DCI 0_2 and USS DCI 1_2 (if configured).

As further shown in FIG. 3B, and by step 335, the UE may perform a second set of alignment actions. For example, the UE may maintain CSS DCI 0_0, CSS DCI 1_0, USS DCI 0_0, USS DCI 1_0, USS DCI 0_1, and USS DCI 1_1 (if configured); and may align USS DCI 0_2 with USS DCI 1_2 (if configured) by adding padding bits to one or the other to cause USS DCI 0_2 and USS DCI 1_2 to have a common size (e.g., Size E or Size F).

As further shown in FIG. 3B, and by step 340, the UE may perform a third set of alignment actions. For example, the UE may maintain CSS DCI 0_0, CSS DCI 1_0, USS DCI 0_0, USS DCI 1_0, USS DCI 0_2, and USS DCI 1_2 (if configured); and may align USS DCI 0_1 with USS DCI 1_1 (if configured) by adding padding bits to one or the other to cause USS DCI 0_1 and USS DCI 1_1 to have a common size (e.g., Size C or Size D). In some cases, the UE may repeat the check of step 325 after each of steps 330, 335, and 340. In other cases, the UE may perform a multiple of steps 330, 335, and/or 340 before repeating the check of step 325. After performing the size alignment procedure, the UE ensures that the DCI size thresholds are satisfied, which enables the UE to successfully monitor for the configured DCIs.

As indicated above, FIGS. 3A and 3B are provided as examples. Other examples may differ from what is described with respect to FIGS. 3A and 3B.

FIG. 4 is a diagram illustrating an example 400 of DCI size alignment, in accordance with the present disclosure. As shown in FIG. 4, a group of UEs (UE1, UE2, and UE3) operating in a cell may each monitor different DCI sizes for unicast DCIs, different DCI sizes for group-common (GC) physical downlink control channel (PDCCH), and a common DCI size for a multicast DCI.

As shown in FIG. 4, the UEs may align respective DCI sizes that the UEs are to monitor to satisfy a DCI size threshold. For example, each UE may align a size of a respective GC-PDCCH, that the respective UE is to monitor, to the size of the multicast DCI. In other words, the first UE may add padding bits to change a size of a first GC-PDCCH from 32 bits to 75 bits. Similarly, the second UE and the third UE may add padding bits to change a size of a second GC-PDCCH from 48 bits to 75 bits. In this way, each UE ensures that the DCI size threshold is satisfied for DCIs that each UE is to monitor. However, performing DCI size alignment to modify a GC-PDCCH that a UE is to monitor may result in a negative performance impact. For example, some UEs may receive the GC-PDCCH, but not the multicast DCI. As a result, some UEs may unnecessarily align the GC-PDCCH to a size of the multicast UE.

As indicated above, FIG. 4 is provided as an example. Other examples may differ from what is described with respect to FIG. 4.

Some aspects described herein provide techniques for DCI size alignment. For example, a UE may align a size of a multicast DCI to a unicast DCI, align a size of a unicast DCI to the multicast DCI, use radio resource control (RRC) signaling for explicit DCI size configuration, use carrier aggregation capability to increase a DCI size threshold, and/or the like. In this case, the UE may determine to perform DCI size alignment (e.g., based at least in part on a DCI size threshold being exceeded) and may use an aforementioned DCI size alignment technique to perform DCI size alignment, thereby improving performance relative to performing DCI size alignment on a GC-PDCCH, as described above.

FIGS. 5A-5E are diagrams illustrating an example 500 associated with DCI size alignment, in accordance with the present disclosure. As shown in FIGS. 5A-5E, example 500 includes communication between one or more base stations 110 and a set of UEs 120 (UE 120-a, UE 120-b, UE 120-c, which may be referred to singularly as a UE 120 and collectively as the UEs 120 depending on the context) in a cell. In some aspects, the one or more base stations 110 and the UEs 120 may be included in a wireless network, such as wireless network 100. The one or more base stations 110 and the UEs 120 may communicate on a wireless access link, which may include an uplink and a downlink.

Figure 5A:
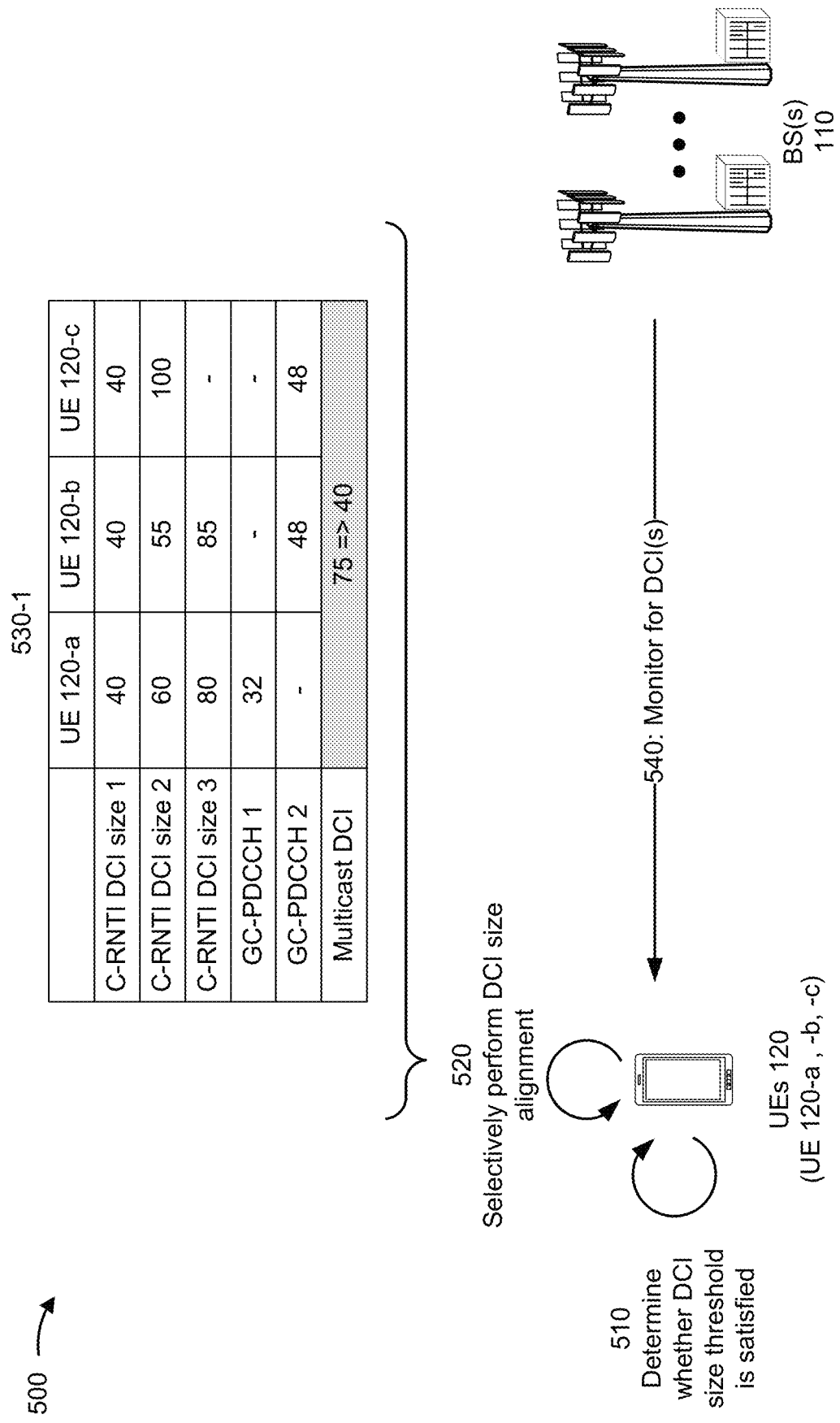
FIGS. 5A 5E are diagrams illustrating examples associated with DCI size alignment, in accordance with the present disclosure.

As shown further shown in FIG. 5A, and by reference number 510, a UE 120 may determine whether a DCI size threshold is satisfied. For example, the UE 120 may determine whether a quantity of DCI sizes for the DCI formats with cyclic redundancy checks (CRCs) scrambled with a C-RNTI that the UE 120 is to monitor exceeds 3 DCIs sizes and/or whether a quantity of DCI sizes that UE 120 is to monitor exceeds 4 DCI sizes (which may be referred to as a '3+4 DCI size threshold'). In this case, when the UE 120 determines that the 3+4 DCI size threshold is satisfied, UE 120 may determine to perform DCI size alignment.

As shown further shown in FIG. 5A, and by reference number 520, a UE 120 may determine to perform DCI size alignment. In some aspects, a UE 120 may align a size of a multicast DCI to a C-RNTI DCI, such as CSS DCI format 0_0, DCI format 1_0, and/or the like. For example, as shown by diagram 530-1, the UEs 120 may align the multicast DCI with the CSS DCI 0_0/1_0, which may be a C-RNTI DCI with a first size (C-RNTI DCI size 1). In this case, the UEs 120 may truncate the multicast DCI from 75 bits to 40 bits. In this case, a UE 120 may truncate a most significant bit (MSB), a least significant bit (LSB), a DCI field, and/or the like to match the size of CSS DCI 0_0/1_0. In another example, a UE 120 may add padding bits to the multicast DCI to match the size of CSS DCI 0_0/1_0. Additionally, or alternatively, a DCI size for the multicast DCI may be determined based at least in part on a cell-specific configurations (e.g., a higher layer configurations provided by a master information block or system information), such as for the CSS DCI 0_0/1_0. Similarly, the base stations 110 may ensure that a DCI size for the multicast DCI is the same as the size of CSS DCI 0_0/1_0.

Figure 5B:
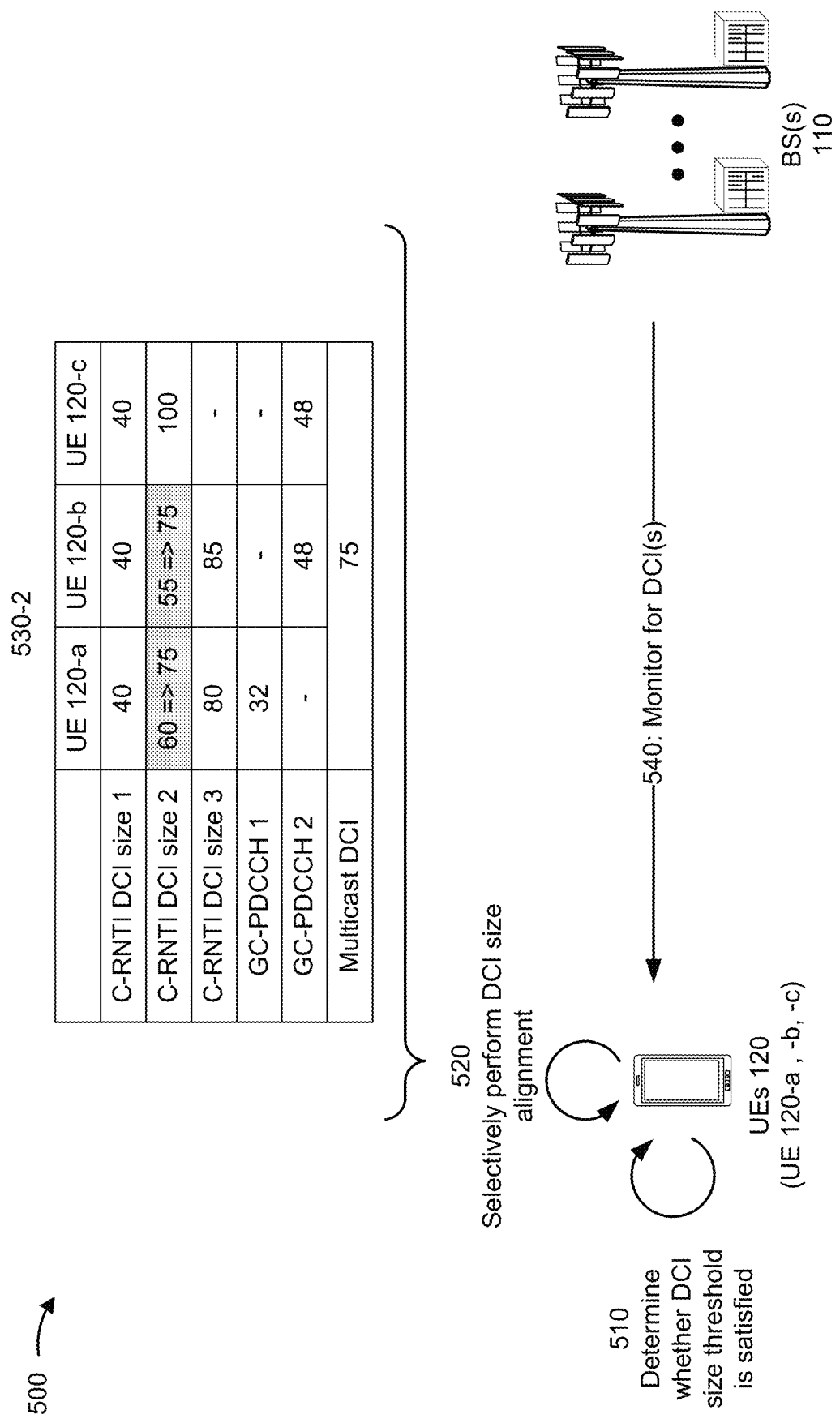
Figure 5C:
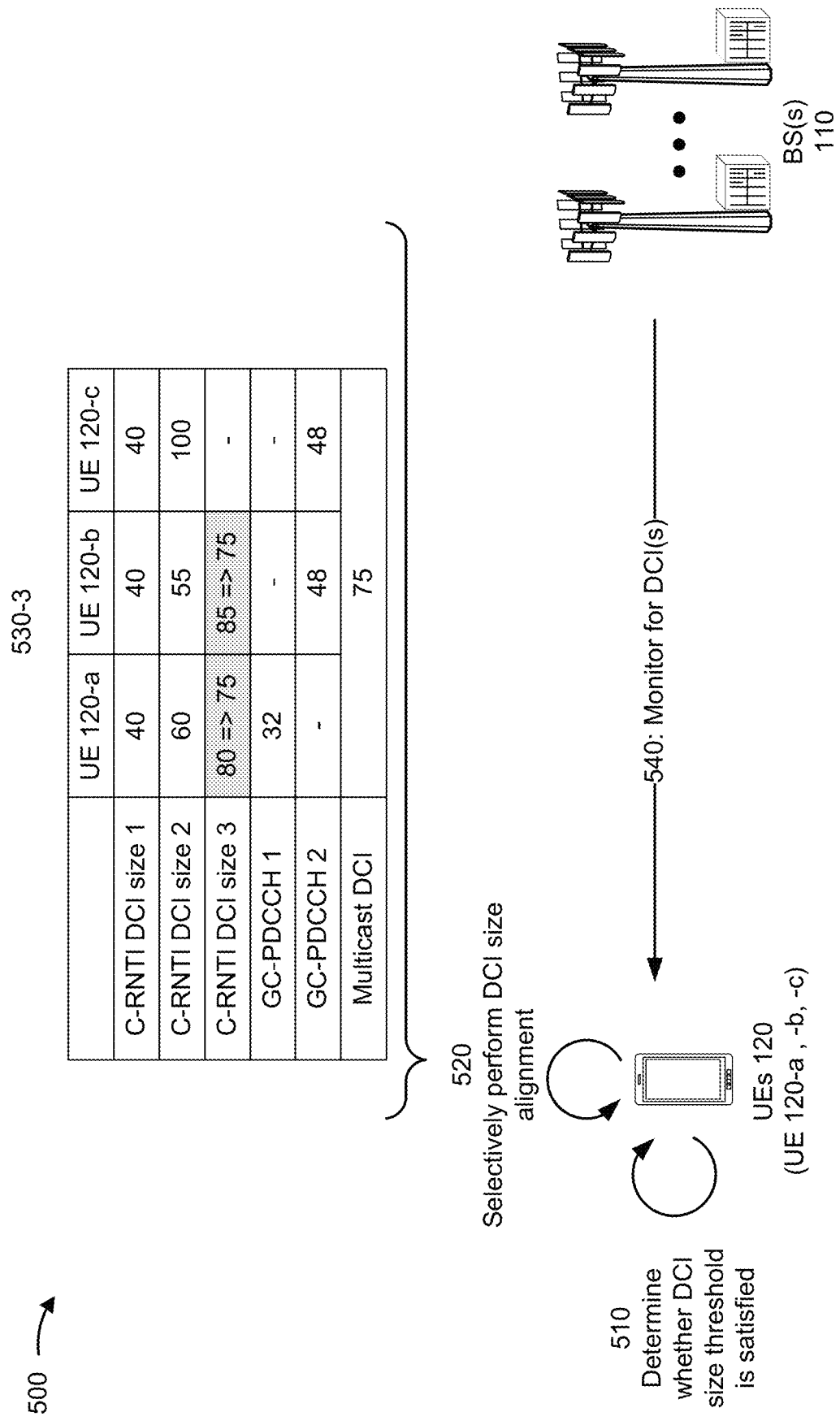

In some aspects, as shown in FIGS. 5B and 5C, the UEs 120 may align the size of a C-RNTI DCI to a size of the multicast DCI. For example, as shown in FIG. 5B, and by diagram 530-2, UE 120-a may add padding bits to a C-RNTI DCI to cause the C-RNTI DCI to change from 60 bits to 75 bits. Similarly, UE 120-b may add padding bits to the C-RNTI DCI to change from 55 bits to 75 bits. In some aspects, the UEs 120 may select, as a C-RNTI DCI to align to the multicast DCI, a C-RNTI DCI with a largest DCI size not exceeding the multicast DCI size. In some aspects, the UEs 120 may set padding bits to a particular value (e.g., zero) to enable use of the padding bits for a CRC or a validation procedure. Additionally, or alternatively, the UEs 120 may use the padding bits for conveying other information in connection with the C-RNTI DCI.

In another example, as shown in FIG. 5C, and by diagram 530-3, UE 120-a may truncate bits of a C-RNTI DCI to cause the C-RNTI DCI change from 80 bits to 75 bits to align with the multicast DCI. Similarly, UE 120-b may truncate bits of the C-RNTI DCI to change from a size 85 to a size 75 to align with the multicast DCI. In some aspects, the UEs 120 may select, as a C-RNTI DCI to align to the multicast DCI, a C-RNTI DCI with a smallest DCI size exceeding the multicast DCI size. In some aspects, the UEs 120 may truncate MSBs of a FDRA field for truncation.

Figure 5D:
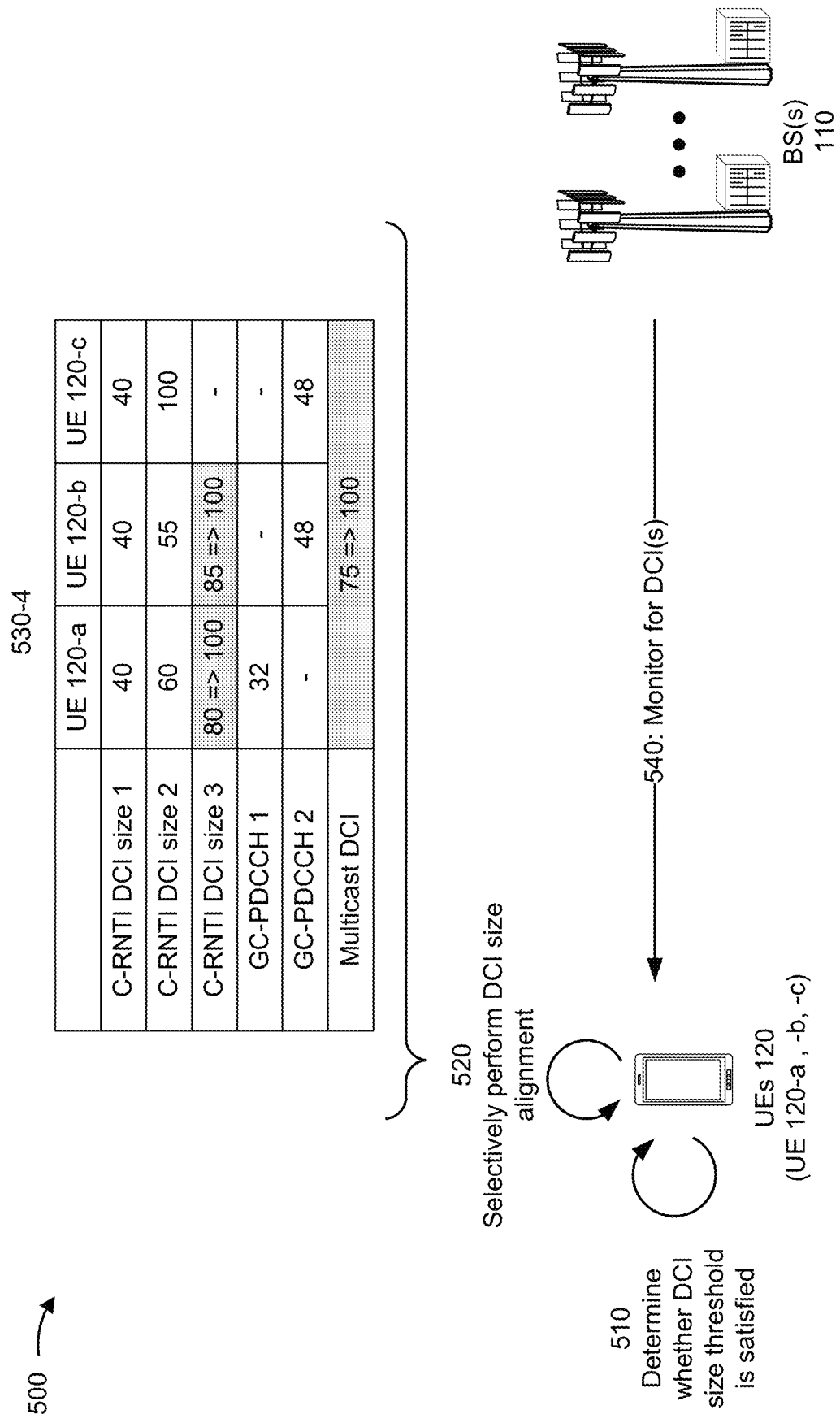
Figure 5E:
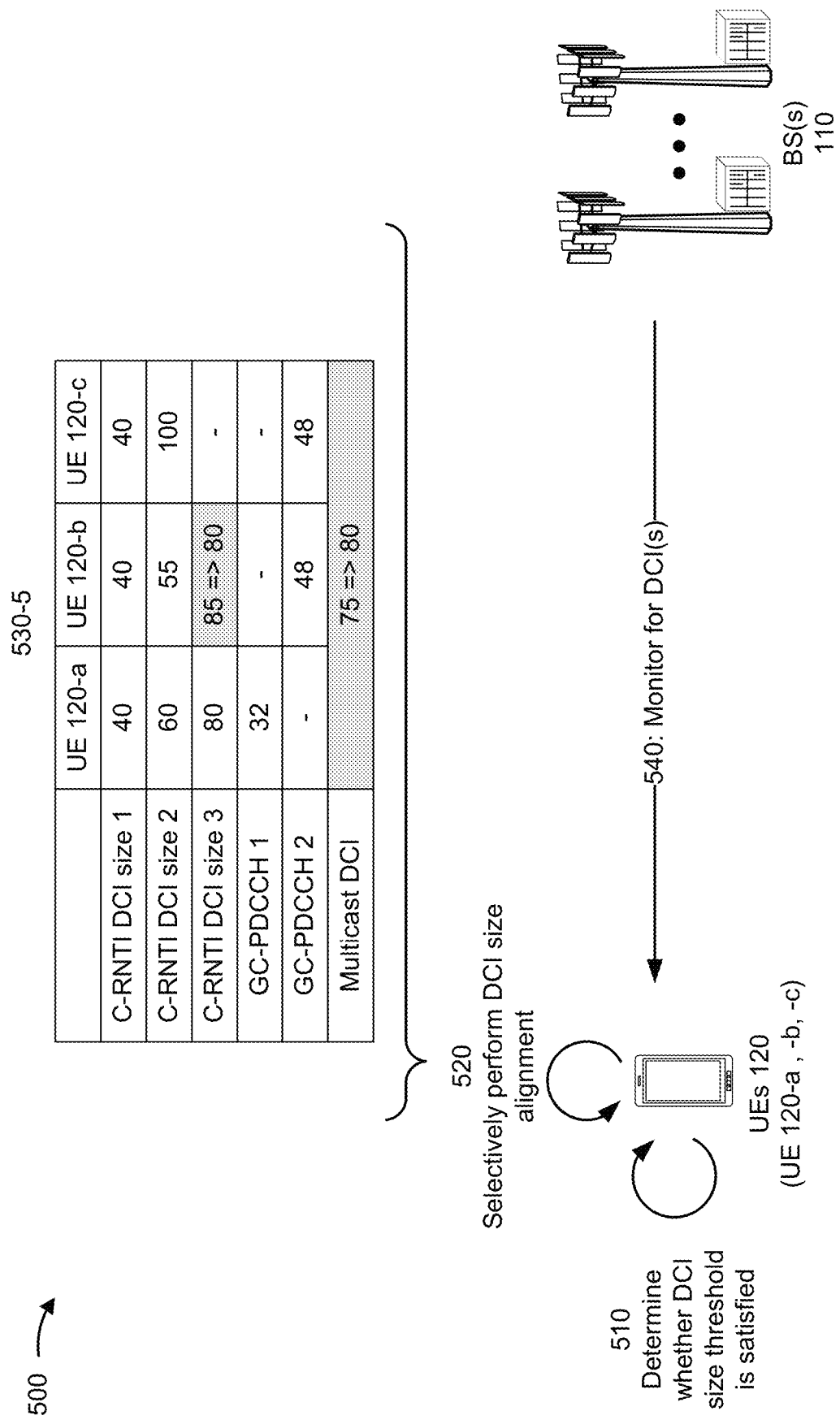

In some aspects, as shown in FIGS. 5D and 5E, UE 120 may perform DCI size alignment based at least in part on an RRC parameter. For example, the UEs 120 may identify the multicast DCI size based at least in part on a multicast configuration, which may result in a conflict between the identified multicast DCI size and an RRC signaled multicast DCI size. In this case, when the identified multicast DCI size is less than the signaled multicast DCI size, the UEs 120 may add padding bits (e.g., CRC bits, validation bits, information bits, and/or the like) to the identified multicast DCI size to align the identified multicast DCI size with the signaled multicast DCI size. Additionally, or alternatively, when the identified multicast DCI size is greater than the signaled multicast DCI size, the UEs 120 may truncate the identified multicast DCI size (e.g., by truncating MSBs, LSBs, and/or the like of a particular field, such as an MSB of an FDRA field). In some aspects, the UEs 120 may receive a plurality of multicast services on a single cell. In this case, the UEs 120 may apply the signaled multicast DCI size for all multicast DCIs, on a per multicast service basis, and/or the like.

As shown in FIG. 5D, and by diagram 530-4, UE 120-a may pad a C-RNTI DCI size to change the C-RNTI DCI size from 80 bits to 100 bits and may also pad the multicast DCI to change the multicast DCI from 75 bits to 100 bits based at least in part on an RRC parameter, as described above. Similarly, UE 120-b may pad the C-RNTI DCI from 85 bits to 100 bits and pad the multicast DCI to 100 bits. In another example, as shown in FIG. 5E, and by diagram 530-5, UE 120-b may truncate a C-RNTI DCI size to 80 bits and each UE 120 may pad the multicast DCI to 80 bits to cause each UE 120 to be able to satisfy the 3+4 DCI threshold.

In some aspects, UE 120 may use carrier aggregation to increase a DCI threshold to accommodate a quantity of DCI sizes. For example, when a UE 120 supports multicast and unicast operations on the same serving cell, the UE 120 may use carrier aggregation to allow separate DCI size thresholds for unicast DCIs and for multicast DCIs. In this case, the UE 120 may evaluate the DCI size threshold as a 3+4 DCI size threshold for unicast DCIs and a separate 3+4 DCI size threshold for multicast DCIs. Additionally, or alternatively, the UE 120 may use a processing budget or capability, which is allocated for component carriers in carrier aggregation, for multicast operation. In this cause UE 120 may support N M downlink component carriers for carrier aggregation, where N represents a UE carrier aggregation maximum carrier capability and M represents a quantity of multicast downlink carriers. In some aspects, UE 120 may perform a plurality of actions to enable DCI size alignment. For example, UE 120 may use carrier aggregation to increase a DCI size threshold and may align one or more C-RNTI DCIs to a multicast DCI.

As shown further shown in FIGS. 5A-5E, and by reference number 540, the UEs 120 may monitor for a set of DCIs. For example, based at least in part on performing DCI size alignment, the UEs 120 may monitor for one or more C-RNTI DCIs, a GC-PDCCH, a multicast DCI, and/or the like.

As indicated above, FIGS. 5A-5E are provided as examples. Other examples may differ from what is described with respect to FIGS. 5A-5E.

Figure 6:
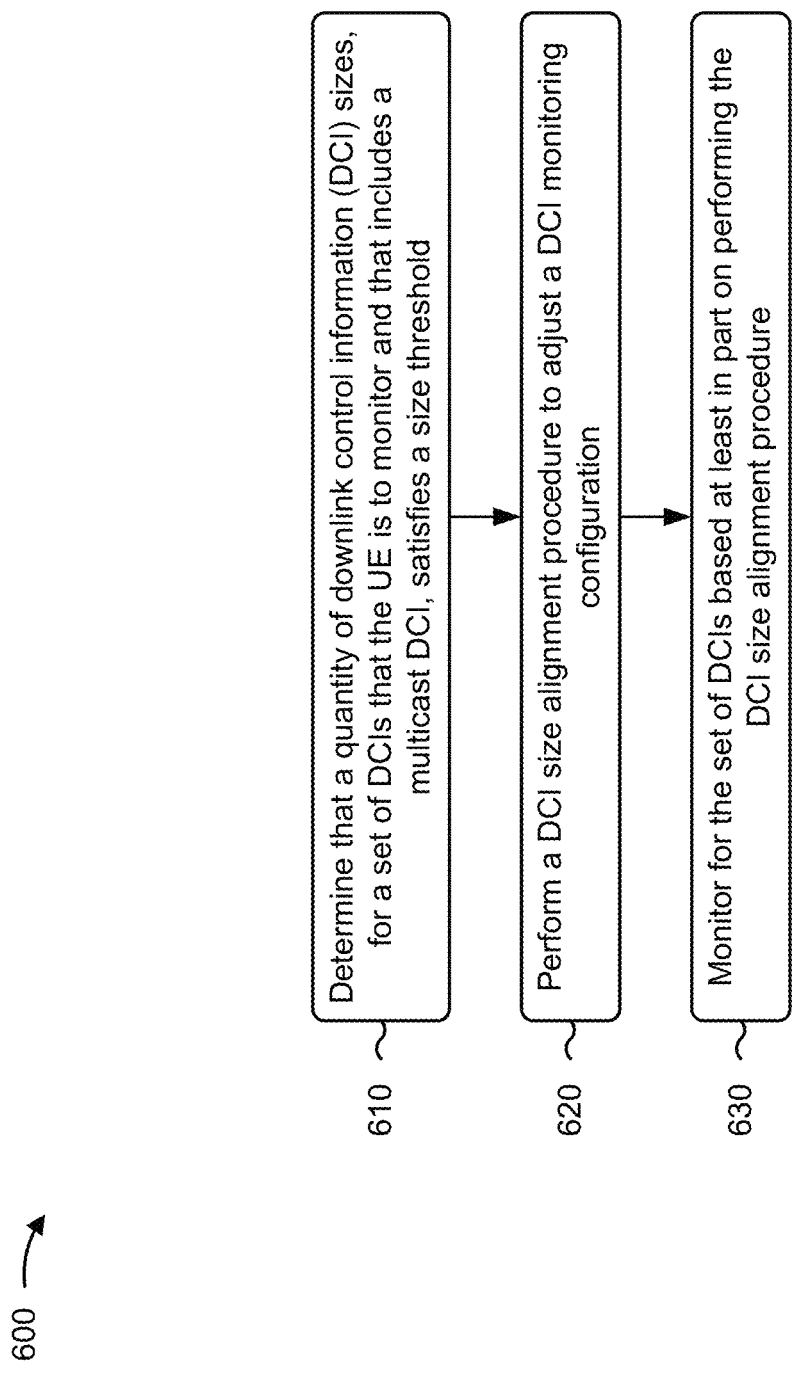
FIG. 6 is a diagram illustrating an example process associated with DCI size alignment, in accordance with the present disclosure.

FIG. 6 is a diagram illustrating an example process 600 performed, for example, by a UE, in accordance with the present disclosure. Example process 600 is an example where the UE (e.g., UE 120) performs operations associated with multicast DCI configuration.

As shown in FIG. 6, in some aspects, process 600 may include determining that a quantity of DCI sizes, for a set of DCIs that the UE is to monitor and that includes a multicast DCI, satisfies a size threshold (block 610). For example, the UE (e.g., using antenna 252, demodulator 254, MIMO detector 256, receive processor 258, transmit processor 264, TX MIMO processor 266, modulator 254, controller/processor 280, and/or memory 282) may determine that a quantity of DCI sizes, for a set of DCIs that the UE is to monitor and that includes a multicast DCI, satisfies a size threshold, as described above.

As further shown in FIG. 6, in some aspects, process 600 may include performing a DCI size alignment procedure to adjust a DCI monitoring configuration (block 620). For example, the UE (e.g., using antenna 252, demodulator 254, MIMO detector 256, receive processor 258, transmit processor 264, TX MIMO processor 266, modulator 254, controller/processor 280, and/or memory 282) may perform a DCI size alignment procedure to adjust a DCI monitoring configuration, as described above.

As further shown in FIG. 6, in some aspects, process 600 may include monitoring for the set of DCIs based at least in part on performing the DCI size alignment procedure (block 630). For example, the UE (e.g., using antenna 252, demodulator 254, MIMO detector 256, receive processor 258, transmit processor 264, TX MIMO processor 266, modulator 254, controller/processor 280, and/or memory 282) may monitor for the set of DCIs based at least in part on performing the DCI size alignment procedure, as described above.

Process 600 may include additional aspects, such as any single aspect or any combination of aspects described below and/or in connection with one or more other processes described elsewhere herein.

In a first aspect, the multicast DCI is a DCI that schedules multicast data.

In a second aspect, alone or in combination with the first aspect, at least one of the multicast DCI or the multicast data is associated with a group-radio network temporary identifier (G-RNTI).

In a third aspect, alone or in combination with one or more of the first and second aspects, the G-RNTI is configured via received higher layer signaling directed to a group of UEs, which includes the UE, that are to receive the multicast data.

In a fourth aspect, alone or in combination with one or more of the first through third aspects, performing the DCI size alignment procedure comprises aligning a first size of the multicast DCI with a second size of another DCI of the set of DCIs.

In a fifth aspect, alone or in combination with one or more of the first through fourth aspects, the other DCI is a common search space DCI format 0_0 or a common search space DCI format 1_0.

In a sixth aspect, alone or in combination with one or more of the first through fifth aspects, performing the DCI size alignment procedure comprises aligning a first size of another DCI of the set of DCIs with a second size of the multicast DCI.

In a seventh aspect, alone or in combination with one or more of the first through sixth aspects, performing the DCI size alignment procedure comprises configuring a size of the multicast DCI based at least in part on a radio resource control parameter.

In an eighth aspect, alone or in combination with one or more of the first through seventh aspects, performing the DCI size alignment procedure comprises dividing the set of DCIs into a plurality of groups, wherein a first group, of the plurality of groups, includes non-multicast DCIs, and a second group, of the plurality of groups, includes the multicast DCI, and processing each group, of the plurality of groups, using resources assigned for a respective cell in carrier aggregation.

In a ninth aspect, alone or in combination with one or more of the first through eighth aspects, performing the DCI size alignment procedure comprises adjusting a configuration of at least one DCI of the set of DCIs by at least one of a truncation of a set of bits or a padding of the set of bits.

In a tenth aspect, alone or in combination with one or more of the first through ninth aspects, the set of bits is a set of most significant bits or a set of least significant bits.

In an eleventh aspect, alone or in combination with one or more of the first through tenth aspects, determining that the quantity of DCI sizes for the set of DCIs that includes the multicast DCI satisfies the size threshold comprises determining a size of the multicast DCI based at least in part on a UE-common higher-layer configuration.

In a twelfth aspect, alone or in combination with one or more of the first through eleventh aspects, the set of DCIs includes a plurality of multicast DCIs, and wherein determining that the quantity of DCI sizes satisfies the size threshold comprises determining a size of each of the plurality of multicast DCIs based at least in part on a multicast-associated configuration.

In a thirteenth aspect, alone or in combination with one or more of the first through twelfth aspects, the set of DCIs includes a plurality of multicast DCIs, and wherein determining that the quantity of DCI sizes satisfies the size threshold comprises determining a size for each of the plurality of multicast DCIs based at least in part on a respective multicast-associated configuration.

In a fourteenth aspect, alone or in combination with one or more of the first through thirteenth aspects, performing the DCI size alignment procedure comprises selecting a DCI size alignment mode from a plurality of DCI size alignment modes, and performing the DCI size alignment procedure in accordance with the DCI size alignment mode.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
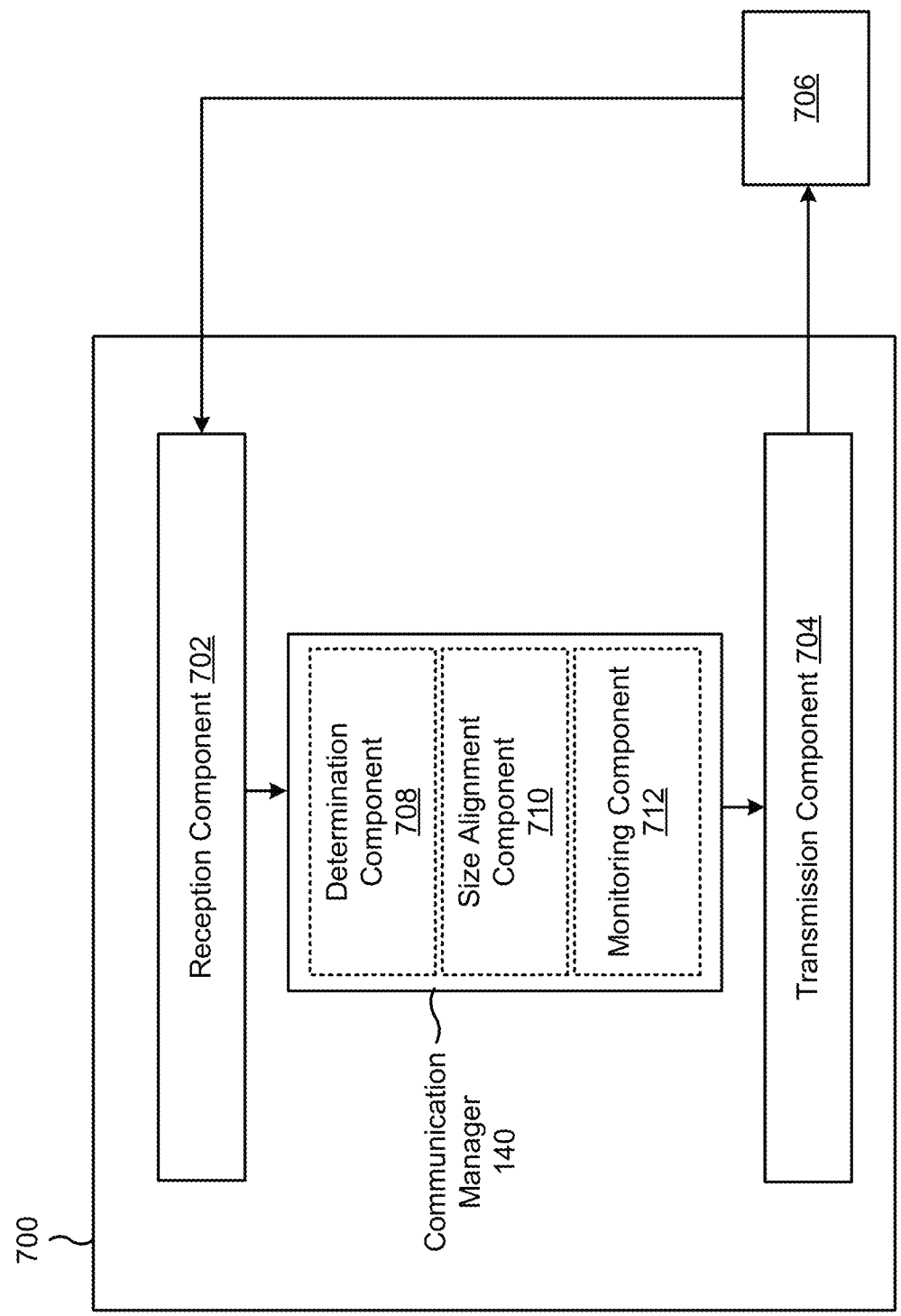
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a determination component 708, a size alignment component 710, or a monitoring component 712, among other examples.

In some aspects, the apparatus 700 may be configured to perform one or more operations described herein in connection with FIGS. 5A-5E. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The determination component 708 may determine that a quantity of DCI sizes, for a set of DCIs that the UE is to monitor and that includes a multicast DCI, satisfies a size threshold. The size alignment component 710 may perform a DCI size alignment procedure to adjust a DCI monitoring configuration. The monitoring component 712 may monitor for the set of DCIs based at least in part on performing the DCI size alignment procedure.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: determining that a quantity of downlink control information (DCI) sizes, for a set of DCIs that the UE is to monitor and that includes a multicast DCI, satisfies a size threshold; performing a DCI size alignment procedure to adjust a DCI monitoring configuration; and monitoring for the set of DCIs based at least in part on performing the DCI size alignment procedure.

Aspect 2: The method of Aspect 1, wherein the multicast DCI is a DCI that schedules multicast data.

Aspect 3: The method of Aspect 2, wherein at least one of the multicast DCI or the multicast data is associated with a group-radio network temporary identifier (G-RNTI).

Aspect 4: The method of Aspect 3, wherein the G-RNTI is configured via received higher layer signaling directed to a group of UEs, which includes the UE, that are to receive the multicast data.

Aspect 5: The method of any of Aspects 1 to 4, wherein performing the DCI size alignment procedure comprises: aligning a first size of the multicast DCI with a second size of another DCI of the set of DCIs.

Aspect 6: The method of Aspect 5, wherein the other DCI is a common search space DCI format 0_0 or a common search space DCI format 1_0.

Aspect 7: The method of any of Aspects 1 to 6, wherein performing the DCI size alignment procedure comprises: aligning a first size of another DCI of the set of DCIs with a second size of the multicast DCI.

Aspect 8: The method of any of Aspects 1 to 7, wherein performing the DCI size alignment procedure comprises: configuring a size of the multicast DCI based at least in part on a radio resource control parameter.

Aspect 9: The method of any of Aspects 1 to 8, wherein performing the DCI size alignment procedure comprises: dividing the set of DCIs into a plurality of groups, wherein a first group, of the plurality of groups, includes non-multicast DCIs, and a second group, of the plurality of groups, includes the multicast DCI; and processing each group, of the plurality of groups, using resources assigned for a respective cell in carrier aggregation.

Aspect 10: The method of any of Aspects 1 to 9, wherein performing the DCI size alignment procedure comprises: adjusting a configuration of at least one DCI of the set of DCIs by at least one of a truncation of a set of bits or a padding of the set of bits.

Aspect 11: The method of Aspect 10, wherein the set of bits is a set of most significant bits or a set of least significant bits.

Aspect 12: The method of any of Aspects 1 to 11, wherein determining that the quantity of DCI sizes for the set of DCIs that includes the multicast DCI satisfies the size threshold comprises: determining a size of the multicast DCI based at least in part on a UE-common higher-layer configuration.

Aspect 13: The method of any of Aspects 1 to 12, wherein the set of DCIs includes a plurality of multicast DCIs, and wherein determining that the quantity of DCI sizes satisfies the size threshold comprises: determining a size of each of the plurality of multicast DCIs based at least in part on a multicast-associated configuration.

Aspect 14: The method of any of Aspects 1 to 13, wherein the set of DCIs includes a plurality of multicast DCIs, and wherein determining that the quantity of DCI sizes satisfies the size threshold comprises: determining a size for each of the plurality of multicast DCIs based at least in part on a respective multicast-associated configuration.

Aspect 15: The method of any of Aspects 1 to 14, wherein performing the DCI size alignment procedure comprises: selecting a DCI size alignment mode from a plurality of DCI size alignment modes; and performing the DCI size alignment procedure in accordance with the DCI size alignment mode.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        determine that a quantity of downlink control information (DCI) sizes, for a set of DCIs that the UE is to monitor and that includes a multicast DCI, satisfies a size threshold that indicates a quantity of sizes, wherein the multicast DCI is associated with a group-radio network temporary identifier (G-RNTI) that is configured via higher layer signaling directed to a group of UEs that are to receive multicast data scheduled by the multicast DCI;
        perform a DCI size alignment procedure to adjust a DCI monitoring configuration, wherein the one or more processors, to perform the DCI size alignment procedure, are configured to: configure a size of the multicast DCI based at least in part on a radio resource control parameter; and
        monitor for the set of DCIs based at least in part on performing the DCI size alignment procedure.

2. The UE of claim 1, wherein the size of the multicast DCI matches a size of a unicast DCI.

3. The UE of claim 2, wherein the multicast data is associated with the G-RNTI.

4. The UE of claim 3, wherein the group of UEs includes the UE.

5. The UE of claim 1, wherein the one or more processors, to perform the DCI size alignment procedure, are configured to:
    adjust a configuration of at least one DCI of the set of DCIs by at least one of a truncation of a set of bits or a padding of the set of bits.

6. The UE of claim 5, wherein the set of bits is a set of most significant bits or a set of least significant bits.

7. The UE of claim 1, wherein the one or more processors, to determine that the quantity of DCI sizes satisfies the size threshold, are configured to:
    determine the size of the multicast DCI based at least in part on a UE-common higher-layer configuration.

8. The UE of claim 1, wherein the set of DCIs includes a plurality of multicast DCIs, and
    wherein the one or more processors, to determine that the quantity of DCI sizes satisfies the size threshold, are configured to:
        determine a size of each of the plurality of multicast DCIs based at least in part on a multicast-associated configuration.

9. The UE of claim 1, wherein the set of DCIs includes a plurality of multicast DCIs, and
    wherein the one or more processors, to determine that the quantity of DCI sizes satisfies the size threshold, are configured to:
        determine a size for each of the plurality of multicast DCIs based at least in part on a respective multicast-associated configuration.

10. The UE of claim 1, wherein the one or more processors, to perform the DCI size alignment procedure, are configured to:
    select a DCI size alignment mode from a plurality of DCI size alignment modes; and
    perform the DCI size alignment procedure in accordance with the DCI size alignment mode.

11. The UE of claim 1,
    wherein the one or more processors, to determine that the quantity of DCI sizes satisfies the size threshold, are configured to:
        determine that the quantity of DCI sizes is greater than the size threshold, and
    wherein the one or more processors are configured to perform the DCI size alignment procedure based at least in part on the determination that the quantity of DCI sizes is greater than the size threshold.

12. The UE of claim 1, wherein the one or more processors, to perform the DCI size alignment procedure, are configured to:
    adjust a configuration of at least one DCI of the set of DCIs by at least a truncation of a set of bits.

13. The UE of claim 12, wherein the set of bits is a set of most significant bits or a set of least significant bits.

14. A method of wireless communication performed by a user equipment (UE), comprising:
    determining that a quantity of downlink control information (DCI) sizes, for a set of DCIs that the UE is to monitor and that includes a multicast DCI, satisfies a size threshold that indicates a quantity of sizes, wherein the multicast DCI is associated with a group-radio network temporary identifier (G-RNTI) that is configured via higher layer signaling directed to a group of UEs that are to receive multicast data scheduled by the multicast DCI;

performing a DCI size alignment procedure to adjust a DCI monitoring configuration, wherein performing the DCI size alignment procedure comprises configuring a size of the multicast DCI based at least in part on a radio resource control parameter; and monitoring for the set of DCIs based at least in part on performing the DCI size alignment procedure.

15. The method of claim 14, wherein the size of the multicast DCI matches a size of a unicast DCI.

16. The method of claim 15, wherein the multicast data is associated with the G-RNTI.

17. The method of claim 16, wherein the group of UEs, includes the UE.

18. The method of claim 14, wherein performing the DCI size alignment procedure comprises:

adjusting a configuration of at least one DCI of the set of DCIs by at least one of a truncation of a set of bits or a padding of the set of bits.

19. The method of claim 18, wherein the set of bits is a set of most significant bits or a set of least significant bits.

20. The method of claim 14, wherein determining that the quantity of DCI sizes for the set of DCIs that comprises the multicast DCI satisfies the size threshold comprises:

determining the size of the multicast DCI based at least in part on a UE-common higher-layer configuration.

21. The method of claim 14, wherein the set of DCIs includes a plurality of multicast DCIs, and wherein determining that the quantity of DCI sizes satisfies the size threshold comprises:

determining a size of each of the plurality of multicast DCIs based at least in part on a multicast-associated configuration.

22. A non-transitory computer-readable medium storing a set of instructions for wireless communication, the set of instructions comprising:

one or more instructions that, when executed by one or more processors of a user equipment (UE), cause the UE to:

determine that a quantity of downlink control information (DCI) sizes, for a set of DCIs that the UE is to monitor and that includes a multicast DCI, satisfies a size threshold that indicates a quantity of sizes, wherein the multicast DCI is associated with a group-radio network temporary identifier (G-RNTI) that is configured via higher layer signaling directed to a group of UEs that are to receive multicast data scheduled by the multicast DCI;

perform a DCI size alignment procedure to adjust a DCI monitoring configuration, wherein one or more instructions, of the one or more instructions, that cause the UE to perform the DCI size alignment procedure cause the UE to configure a size of the multicast DCI based at least in part on a radio resource control parameter; and monitor for the set of DCIs based at least in part on performing the DCI size alignment procedure.

23. An apparatus for wireless communication, comprising:

means for determining that a quantity of downlink control information (DCI) sizes, for a set of DCIs that the apparatus is to monitor and that includes a multicast DCI, satisfies a size threshold that indicates a quantity of sizes, wherein the multicast DCI is associated with a group-radio network temporary identifier (G-RNTI) that is configured via higher layer signaling directed to a group of user equipments (UEs) that are to receive multicast data scheduled by the multicast DCI;

means for performing a DCI size alignment procedure to adjust a DCI monitoring configuration, wherein the means for performing the DCI size alignment procedure comprise means for configuring a size of the multicast DCI based at least in part on a radio resource control parameter; and means for monitoring for the set of DCIs based at least in part on performing the DCI size alignment procedure.

24. The apparatus of claim 23, wherein the size of the multicast DCI matches a size of a unicast DCI.

25. The apparatus of claim 24, wherein the multicast data is associated with the G-RNTI.

26. The apparatus of claim 25, wherein the group of UEs includes the apparatus.

27. The apparatus of claim 23, wherein the means for performing the DCI size alignment procedure comprises:

means for adjusting a configuration of at least one DCI of the set of DCIs by at least a truncation of a set of bits.

28. The apparatus of claim 27, wherein the set of bits is a set of most significant bits or a set of least significant bits.

29. The apparatus of claim 23, wherein the means for determining that the quantity of DCI sizes satisfies the size threshold comprises:

means for determining the size of the multicast DCI based at least in part on a UE- common higher-layer configuration.

30. The apparatus of claim 23, wherein the set of DCIs includes a plurality of multicast DCIs, and wherein the means for determining that the quantity of DCI sizes satisfies the size threshold comprises:

means for determining a size of each of the plurality of multicast DCIs based at least in part on a multicast-associated configuration.

* * * * *